United States Patent
Kin (10) Patent No.: US 7,205,886 B2
(45) Date of Patent: Apr. 17, 2007

(54) TIRE PRESSURE MONITORING SYSTEM

(75) Inventor: Keiyu Kin, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 375 days.

(21) Appl. No.: 10/867,444

(22) Filed: Jun. 14, 2004

(65) Prior Publication Data

US 2004/0260436 A1   Dec. 23, 2004

(30) Foreign Application Priority Data

Jun. 19, 2003   (JP) .............................. 2003-174399

(51) Int. Cl.
  *B60C 23/02*  (2006.01)
  *B60C 23/06*  (2006.01)
(52) U.S. Cl. ................... 340/442; 701/29; 73/146.2
(58) Field of Classification Search ................ 340/442; 701/29, 31; 73/146.2
  See application file for complete search history.

(56) References Cited

U.S. PATENT DOCUMENTS

| | | | | |
|---|---|---|---|---|
| 4,630,470 A | * | 12/1986 | Brooke et al. ............. | 73/146.2 |
| 5,596,141 A | * | 1/1997 | Nishikawa et al. ........ | 73/146.2 |
| 5,723,768 A | * | 3/1998 | Ammon .......................... | 73/8 |
| 5,982,279 A | * | 11/1999 | Tominaga et al. .......... | 340/444 |
| 6,092,028 A | * | 7/2000 | Naito et al. .................. | 702/47 |
| 6,102,144 A | * | 8/2000 | Lutz .......................... | 180/65.2 |
| 6,142,026 A | * | 11/2000 | Ohashi et al. ............. | 73/865.9 |
| 6,385,553 B1 | * | 5/2002 | Naito et al. ................ | 702/138 |
| 6,584,427 B2 | * | 6/2003 | Kamiya et al. ............. | 702/140 |
| 6,993,449 B2 | * | 1/2006 | Koebe et al. ............... | 702/138 |
| 7,032,436 B2 | * | 4/2006 | Yokota et al. ................ | 73/105 |
| 2004/0260436 A1 | * | 12/2004 | Kin .............................. | 701/29 |
| 2005/0072223 A1 | * | 4/2005 | Fennel et al. ............. | 73/146.2 |
| 2005/0085987 A1 | * | 4/2005 | Yokota et al. ................ | 701/80 |
| 2006/0276984 A1 | * | 12/2006 | Kobe et al. .................. | 702/75 |

FOREIGN PATENT DOCUMENTS

| | | |
|---|---|---|
| JP | 63-305011 | 12/1988 |
| JP | 05-133831 | 5/1993 |
| JP | 08-277469 | * 9/1996 |
| JP | 2000-359588 | * 11/2000 |
| WO | PCT/US99/29606 | * 6/2001 |
| WO | PCT/JP01/08963 | * 4/2002 |
| WO | PCT/IB02/00576 | * 9/2002 |

* cited by examiner

*Primary Examiner*—Cuong Nguyen
(74) *Attorney, Agent, or Firm*—Carrier, Blackman & Associates, P.C.; Joseph P. Carrier; William D. Blackman (57) ABSTRACT

A vehicle C is provided with four wheel speed sensors VS (VSfl, VSfr, VSrl, VSrr) (wheel vibration detection means) for detecting wheel speed V (Vfl, Vfr, Vrl, Vrr) at respective four wheels W (left and right front wheels Wfl, Wfr and left and right rear wheels Wrl, Wrr). When the tire pressure is in the normal value, a tire pressure monitoring system 1 prepares vibration frequency reference spectrum data for predetermined vehicle speed bands based on the detection values of each wheel speed sensor VS. The tire pressure monitoring system 1 compares the current vibration frequency spectrum data and the vibration frequency reference spectrum data corresponding to the current vehicle speed band, and determines that the tire is underinflated if the comparison result exceeds a predetermined value.

10 Claims, 8 Drawing Sheets

TIRE PRESSURE MONITORING SYSTEM

CROSS-REFERENCE TO RELATED APPLICATIONS

The present application claims priority to Japanese Patent Application No. 2003-174399, the contents of which are hereby incorporated by reference.

BACKGROUND OF THE INVENTION

The present invention relates to a tire pressure monitoring system to be mounted, for example, on a vehicle, and particularly to a technique for accurately monitoring tire pressure with a relatively simple structure.

Drivability or maneuvering stability of vehicles greatly depends on air pressure of tires as contacting points with the road surface as well as the structure of suspensions or a steering device. For example, a tire with insufficient air pressure inevitably decreases its rigidity and increases its contact area with the road surface. By this and also due to lack of uniformity (lack of uniformity of the shape), the steering response deteriorates to a greater extent. Because decreased tire pressure results in an increase in temperature of the tire or an occurrence of standing wave during high speed driving of the vehicle as well as deteriorated fuel economy, it is therefore necessary to strictly prevent the decrease in the tire pressure in terms of stability and an economical viewpoint. Conventionally, drivers or driving administrators usually check and maintain the tire pressure by means of an air charger (air gauge) equipped in gas stations and the like.

Air pressure lowers due to a leakage of air, which possibly happens if a nail or pieces of broken glass cut the tire during the running of the vehicle and thereby creating a hole in the tread or if the air tight seal between the tire bead and the wheel rim is insufficient. However, slow leak wherein air leaks gradually and very slowly has become common in recent tubeless tires. In the case of slow leak, it is difficult for the driver to notice lowering of the air pressure (underinflation of tires) at an early stage of the driving because the drivability or maneuvering stability deteriorates very slowly.

For this reason, as a tire pressure monitoring system (TPMS) for monitoring lowering of air pressure during the driving of a vehicle, an air pressure sensor including a distortion gauge, a transmitter, a battery, etc. is mounted on each wheel (hub). This kind of tire pressure monitoring system is complicated in its structure and the usage thereof is strict, which may cause a malfunction of the air pressure sensor during the driving on a rough road or the like. Further, monitoring the air pressure can not be performed if the battery is run out.

Therefore, in recent years, the tire pressure monitoring system has mainly been of the type which determines lowering of the tire pressure based on detection values of wheel speed sensors, such as used for an antilock braking system. For example, Japanese Patent Publication No.5-55322 (e.g. claims 1 and 2, FIG. 1) discloses a method for determining lowering of air pressure, for example, based on a ratio between the total of angular velocities of a pair of tires positioned in one diagonal line and the total of angular velocities of the other pair of tires positioned in the other diagonal line. Japanese Patent No.2836652 (e.g. claim 1 and FIG. 4) discloses a tire pressure detecting system for determining lowering of air pressure (underinflation of the tire) based on the fact that the peak value of the tire vibration frequency spectrum lowers or shifts (along the axis of frequency) in accordance with velocity bands of the vehicle and with respect to the normal air pressure values stored in a ROM or the like. These tire pressure monitoring systems perform mechanically stable monitoring of the air pressure.

However, wheel speed sensor calculates wheel speed by means of detecting the number of rotations of the wheel (tire) per unit of time. If the air pressure of the tire changes due to slow leak or the like, the tire diameter per se changes, resulting in a change of the wheel speed. Therefore, the vehicle speed that is calculated from the wheel speed also changes accordingly. The same can be said to a vehicle speed sensor which determines the vehicle speed by means of detecting the rotational speed of the output shaft provided in a transmission. A change in the tire diameter makes the vehicle speed vary. Further, the above tire pressure monitoring system disclosed in Japanese Patent No.2836652 determines the tire pressure per one wheel based on the fact that a change in the air pressure makes the spring constant or the damping characteristic of the side wall of the tire vary so that the peak of the vibration frequency spectrum shifts. Therefore, if the tire is replaced with another one, the aforementioned tire characteristics may vary, which disadvantageously causes an inaccurate determination of the air pressure.

In the tire pressure monitoring system disclosed in Japanese Patent Publication No. 5-55322, it is possible to determine lowering of the air pressure (underinflation of the tire) only for one single wheel or three wheels simultaneously. However, this tire pressure monitoring system, in principle, can not determine the lowering of the air pressure for two or four wheels simultaneously. Even in the case of determining the lowering of the air pressure for one or three wheels simultaneously, the dynamic rolling radius of the tire increases by centrifugal force at vehicle speeds higher than a predetermined value (e.g. 120 km/h). This makes it difficult to determine lowering of the air pressure with sufficient accuracy. On the contrary, the tire pressure monitoring system disclosed in Japanese Patent No.2836652 can determine the lowering of the air pressure simultaneously for four wheels. However, because characteristics of the tire (spring constant or damping characteristic) are different in accordance with tire size, brand of the products, and the like as stated previously, if different kinds of tires (other than recommended products) are attached upon replacement of the tires, it may be difficult or impossible to determine the lowering of the air pressure. Further, even if the aforementioned tire pressure monitoring systems disclosed in Japanese Patent Publication No.5-55322 and Japanese Patent No.2836652 are combined, it is very difficult to simultaneously determine the lowering of the air pressure for four wheels irrespective of vehicle speed or kinds of the tires.

In view of the above, the present invention seeks to provide a tire pressure monitoring system, which is relatively simple in its structure and which can highly accurately monitor air pressure of a tire.

SUMMARY OF THE INVENTION

The inventor of the present invention focused attention on the fact that if the air pressure of the tire lowers, a change appears in the tire vibration frequency spectrum per one rotation of the tire, which is obtained from the detection results of the vibration detection means (wheel speed sensors, etc.), and has invented a tire pressure monitoring system which can highly accurately monitor air pressure of a tire irrespective of vehicle speed or kinds of the tires. In general, if the air pressure of a tire lowers, the rolling friction of the tire increases due to increased contact area against the road surface and a constant level random noise (so-called white noise) extending from a lower frequency band to a higher frequency band is mixed, so that the peak value and the band of the tire vibration frequency spectrum are both varied. For this reason, under the normal tire pressure the tire vibration frequency spectrum is previously stored at different vehicle speed bands as tire vibration frequency reference spectrum data, and if the current tire vibration frequency spectrum data is different from the above tire vibration frequency reference spectrum data by a predetermined threshold value or more as the result of a comparison, it can be determined that the tire is underinflated.

According to the present invention, there is provided a tire pressure monitoring system comprising a wheel vibration detection means for detecting vibrations of a wheel mounted to a vehicle, a speed detection means for detecting wheel speed or vehicle speed of the vehicle, a vibration frequency spectrum data producing means, a vibration frequency reference spectrum data storage means, and an air pressure determination means. The vibration frequency spectrum data producing means applies a predetermined converting process to detection values from the wheel vibration detection means, and produces vibration frequency spectrum data consisting of vibration frequency and a gain of the vibration frequency caused by a rotation of the wheel. The vibration frequency reference spectrum data storage means stores a plurality of vibration frequency reference spectrum data in a manner associated with wheel speed or vehicle speed. Herein, the vibration frequency spectrum data is used as a reference for a case where air pressure of a tire attached to the wheel is a normal value. The air pressure determination means reads out the vibration frequency reference spectrum data from the vibration frequency reference spectrum data storage means on the basis of a current wheel speed or a current vehicle speed, and compares a pattern of the thus read out vibration frequency reference spectrum data with a pattern of current vibration frequency spectrum data produced by the vibration frequency spectrum data producing means. The air pressure determination means determines that the tire is underinflated if a comparison result of these patterns exceeds a predetermined value.

If air pressure of tire lowers, the contact area between the tire and the road surface changes and the contact area becomes wider. The wider the contact area, the more the produced vibration frequency spectrum is subject to disturbance. Therefore, as described later in connection with the preferred embodiments, the peak of the vibration frequency spectrum becomes indistinct, so that the vibration frequency spectrum becomes broad. According to the present invention, taking into consideration the fact that lowering of the air pressure makes the contact area wider and with an increase in the contact area the vibration frequency spectrum is more likely to suffer from disturbance and becomes broad, underinflation of the tire (lowering of the air pressure) can be detected for each wheel by comparing a pattern of the current vibration frequency spectrum (vibration frequency current spectrum data) at the current driving with the vibration frequency spectrum (vibration frequency reference spectrum data) in the normal state wherein the air pressure does not lower and the contact area is narrow.

The present invention concerns a comparison as a pattern of the spectrum into which is formulated an influence of disturbance due to increased contact area. This is different from the tire pressure monitoring system disclosed in Japanese Patent No.2836652, in which lowering of the air pressure can be detected for each wheel based on the fact that a decrease in the air pressure makes the spring constant or the damping characteristic of the side wall of the tire vary so that the peak position shifts in the spectrum that is inherent in the tire. Therefore, the tire pressure monitoring system according to the present invention hardly suffers from the influence of characteristics of the tire. In other words, when compared with the system of Japanese Patent No.2836652, the tire pressure monitoring system according to the present invention can detect underinflation of the tire (lowering of the tire pressure) reliably and accurately irrespective of replacement of the tire.

The aforementioned tire pressure monitoring system may further comprise means for producing the vibration frequency reference spectrum data at the time of driving the vehicle by means of applying a predetermined converting process to the detection values from the wheel vibration detection means. The produced vibration frequency reference spectrum data is stored in the vibration frequency reference spectrum data storage means in a manner associated with vehicle speed.

With this construction of the tire pressure monitoring system, even if the tire is replaced with a different kind of tire, underinflation of the tire can be determined precisely by resetting the former reference spectrum data and preparing new reference spectrum data for the replaced tire.

In the aforementioned tire pressure monitoring system, the wheel vibration detection means may be a wheel speed sensor.

Detection values of wheel speed sensor vary due to bumps on the road surface and the like. In other words, wheel speed sensor may be used as a vibration detection sensor. Because wheel speed sensor is generally known and mounted on many of the vehicles, it is not necessary to provide a separate wheel speed sensor for monitoring the tire pressure.

BRIEF DESCRIPTION OF THE DRAWINGS

Preferred embodiments of the present invention will be described below, by way of example only, with reference to the accompanying drawings, in which.

DETAILED DESCRIPTION OF THE INVENTION

With reference to the accompanying drawings, preferred embodiments of the present invention will be described below.

<First Embodiment>

Figure 1:
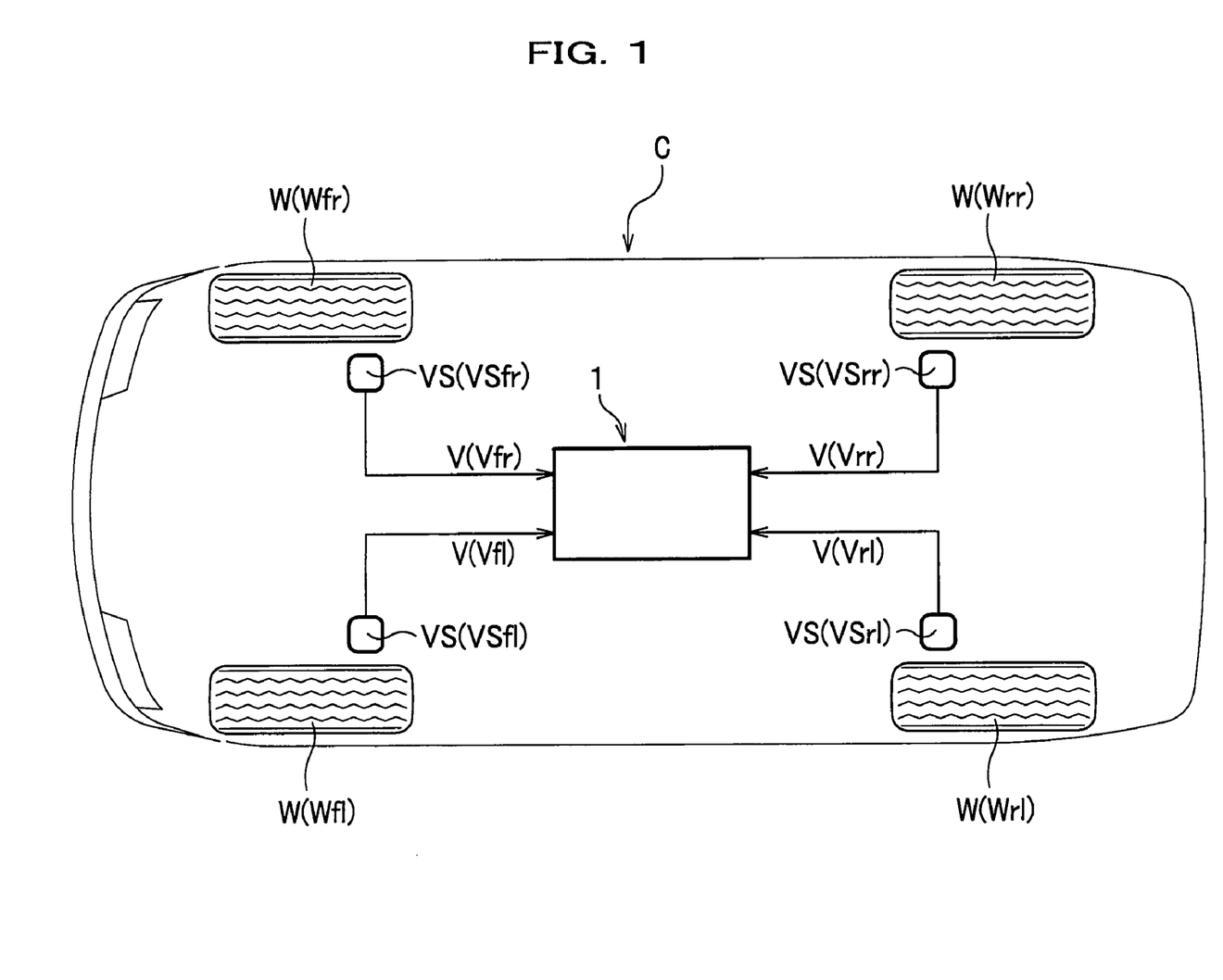
FIG. 1 shows a vehicle onto which is mounted a tire pressure monitoring system according to a first embodiment of the present invention.

FIG. 1 schematically illustrates a four-wheeled vehicle onto which is mounted a tire pressure monitoring system according to a first embodiment.

Construction of Tire Pressure Monitoring System

The construction of a tire pressure monitoring system 1 according to the first embodiment will be described in connection with the construction of a four-wheeled vehicle (hereinafter merely referred to as a "vehicle") C.

As shown in FIG. 1, the vehicle C is provided with a wheel speed sensor VS (VSfl, VSfr, VSrl, VSrr) for detecting wheel speed V (Vfl, Vfr, Vrl, Vrr) as wheel vibration detection means at each wheel W (left and right front wheels Wfl, Wfr and left and right rear wheels Wrl, Wrr). Throughout the specification, subscripts attached to a reference numeral, such as fl, fr, rl, and rr indicate front left wheel side, front right wheel side, rear left wheel side, and rear right wheel side, respectively.

The wheel speed sensor VS is a known wheel sensor which includes, for example, a gear pulser mounted on a wheel (hub) and a pickup coil mounted on a suspension in a position adjacent to the teeth of the gear pulser. The wheel speed sensor VS detects the rotational speed of the wheel based on a flux change induced by the rotation of the gear pulser. Because vehicles equipped with an antilock braking system or traction control system are originally provided with wheel speed sensors VS at the respective wheels, they can be used for the tire pressure monitoring system. As described above, because the wheel speed sensor VS detects the rotation of the wheel, there is a possibility that the wheel speed sensor VS indicates a different value in accordance with air pressure or kinds of the tire even if the vehicle runs in a certain vehicle speed. Other known constructions such as using Hall element, magnetoresistive element or laser light may be employed as a wheel speed sensor VS.

The tire pressure monitoring system 1 includes a microcomputer, a ROM, a RAM, a peripheral circuit, and an input/output interface. The tire pressure monitoring system 1 monitors the tire pressure in such a manner that the microcomputer reads out the program stored in the ROM and information inputted from the wheel speed sensor VS is processed with this program.

Figure 2:
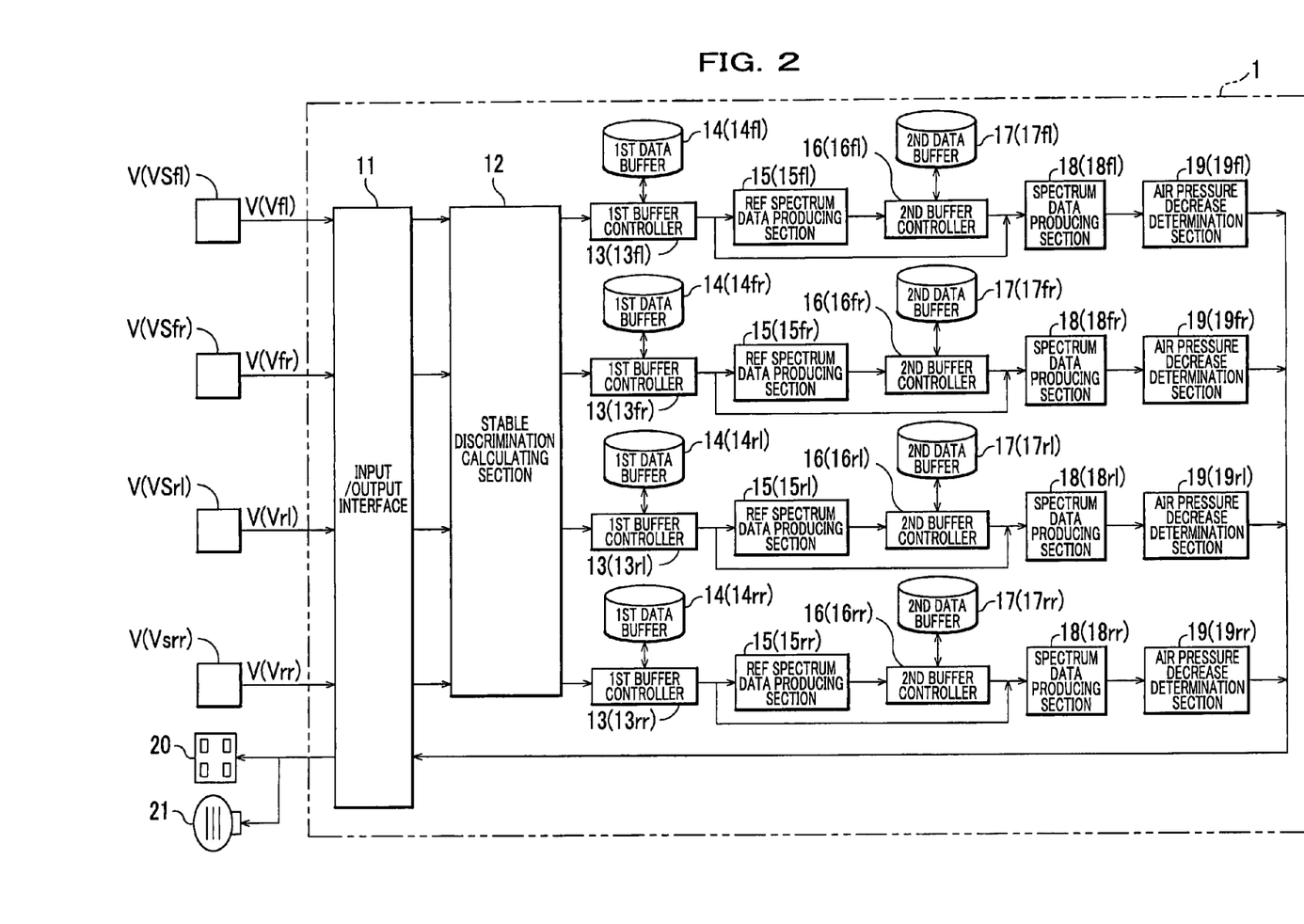
FIG. 2 is a block diagram illustrating a main part of the tire pressure monitoring system of FIG. 1.

FIG. 2 is a block diagram illustrating a main part of the tire pressure monitoring system of FIG. 1.

As shown in the figure, the tire pressure monitoring system 1 mainly consists of an input/output interface 11, a stable discrimination calculating section 12, first buffer controllers 13 (13fl, 13fr, 13rl, 13rr), first data buffers 14 (14fl, 14fr, 14rl, 14rr), reference spectrum data producing sections 15 (15fl, 15fr, 15rl, 15rr), second buffer controllers 16 (16fl, 16fr, 16rl, 16rr), second data buffers 17 (17fl, 17fr, 17rl, 17rr), spectrum data producing sections 18 (18fl, 18fr, 18rl, 18rr), and air pressure decrease determination sections 19 (19fl, 19fr, 19rl, 19rr).

The input/output interface 11 operates to input signals to be processed at the tire pressure monitoring system 1 and to output signals from the tire pressure monitoring system 1. According to this first embodiment, through the input/output interface 11, a detection signal V from each wheel speed sensor VS is inputted to the tire pressure monitoring system 1 and a drive signal is outputted to an air pressure warning indicator light 20 and an air pressure warning buzzer 21.

The stable discrimination calculating section 12 determines drive conditions of the vehicle C and allows the subsequent processes based on the wheel speeds V (Vfl, Vfr, Vrl, Vrr) detected at a stable drive condition. For this reason, the stable discrimination calculating section 12 calculates parameters for turning drive, accelerating/decelerating drive, snowy road drive, etc., and if these parameters are greater than a predetermined threshold value (e.g. the vehicle C is not in the stable drive condition because of turning drive or the like), then removes such data. The detection values V for each wheel speed are thereby allowed to be transmitted to the buffer controller 13.

The buffer controllers 13 (13fl, 13fr, 13rl, 13rr) receive the detection values V (Vfl, Vfr, Vrl, Vrr) for each wheel speed that are inputted through the stable discrimination calculating section 12, for example, at an interval of several milliseconds. Each of the buffer controllers 13 stores these detection values V in the corresponding first data buffer 14 (14fl, 14fr, 14rl, 14rr) as data classified according to each wheel and to respective vehicle speed bands, and reads out the stored detection values V. In the flow of data processing shown in of FIG. 3, the detection values Vfl of wheel speed for the front left wheel Wfl are classified into respective vehicle speed bands and stored in the first data buffer 14fl.

As shown in FIG. 2, each of the first data buffers 14 (14fl, 14fr, 14rl, 14rr) is a random access memory (RAM) for storing the detection values V (Vfl, Vfr, Vrl, Vrr), and reading/writing the data is performed through the first buffer controller 13.

Figure 3:
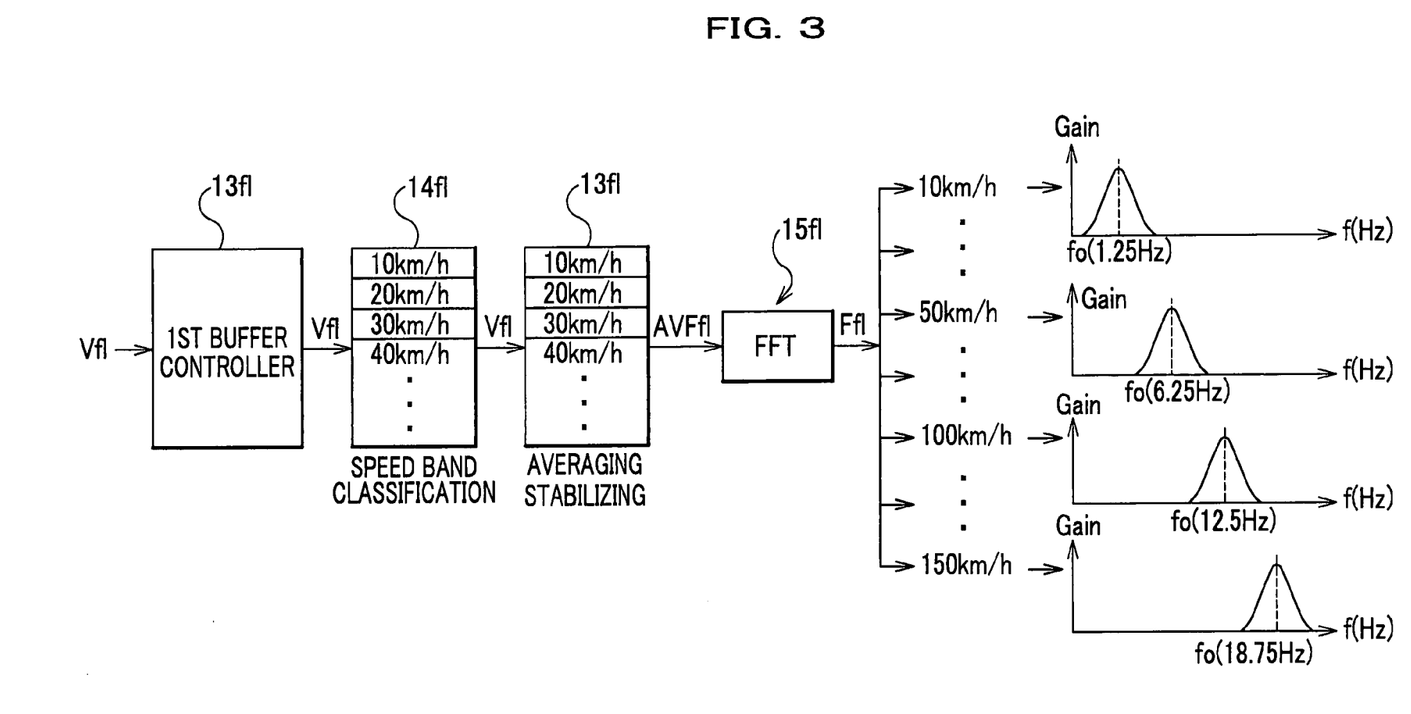
FIG. 3 shows a flow of data processing in the tire pressure monitoring system of FIG. 1.

When more than a predetermined number, for example 1024, of detection values Vfl of the wheel speed are stored in the first data buffer 14fl, the first buffer controller 13fl prepares average reference vehicle speed data that are averaged and stabilized by processing the detection values Vfl by the moving average method. FIG. 3 schematically illustrates that the detection values Vfl of the wheel speed for the front left wheel Wfl are averaged and stabilized in the buffer controller 13fl according to vehicle speed bands. Herein, the moving average is obtained, for example, by calculating the average from the first to tenth detection values Vfl out of 1024 detection values Vfl of the wheel speed, the average from the second to eleventh values Vfl, the average from the third to twelfth values Vfl, . . . , and the average from the 1015th to 1024th values Vfl.

As shown in FIG. 2, based on the 1015 average reference vehicle speed data for each wheel and for respective vehicle speed bands that are produced by the first buffer controller 13 (13fl, 13fr, 13rl, 13rr), each of the reference spectrum data producing sections 15 (15fl, 15fr, 15rl, 15rr) calculates and produces vibration frequency reference spectrum data classified according to each wheel and to respective vehicle speed bands by means of the fast Fourier transform (FFT), and further normalizes them by dividing them by the maximum value of the gain of the spectrum data according to the respective vehicle speed bands. FIG. 3 indicates that the reference spectrum data producing section 15fl produces the vibration frequency reference spectrum data to be normalized according to the respective vehicle speed bands based on the average reference vehicle speed data AVFfl (e.g., 1015 data) for the front left wheel Wfl. Although FIG. 3 explains the process relative to the detection values Vfl of the wheel speed for the front left wheel Wfl, a similar process is applied simultaneously to other wheels Wfr, Wrl, Wrr.

As seen in FIG. 2, each of the second buffer controllers 16 (16fl, 16fr, 16rl, 16rr) writes the vibration frequency reference spectrum data inputted from the corresponding reference spectrum data producing sections 15 (15fl, 15fr, 15rl, 15rr) in the corresponding second data buffer 17 (17fl, 17fr, 17rl, 17rr) in such a manner classified according to each wheel and to the respective vehicle speed bands, an reads out the written vibration frequency reference spectrum data F.

The second data buffers 17 (17fl, 17fr, 17rl, 17rr) are formed by a nonvolatile type random access memory, such as an EEPROM, which stores therein the vibration frequency reference spectrum data, and reading/writing the data is performed through the second buffer controller 16 (16fl, 16fr, 16rl, 12rr). The second data buffer(s) 17 (17fl, 17fr, 17rl, 17rr) corresponds to the "vibration frequency reference spectrum data storage means" defined in the claims.

As shown in FIG. 2, based on the detection values V (Vfl, Vfr, Vrl, Vrr) of each wheel speed that are stored in the first data buffers 14 (14fl, 14fr, 14rl, 14rr), each of the spectrum data producing sections 18 (18fl, 18fr, 18rl, 18rr) calculates and produces for each wheel vibration frequency current spectrum data, that is, the vibration frequency spectrum data at the current time by means of the fast Fourier transform, and further normalizes them by dividing them by the maximum value of the gain of the spectrum data according to each wheel and to the respective vehicle speed bands. The spectrum data producing section 18 produces the vibration frequency current spectrum data at the current time for the purpose of monitoring a change in the tire pressure during the normal drive of the vehicle C, and this is different from the reference spectrum data producing section 15 which produces the reference data of the tire (vibration frequency reference spectrum data) on condition that the tire has recently been replaced. The spectrum data producing section(s) 18 corresponds to the "vibration frequency spectrum data producing means" defined in the claims, and the reference spectrum data producing section(s) 15 corresponds to the "means for producing the vibration frequency reference spectrum data at the time of driving the vehicle by means of applying a predetermined converting process to the detection values from the wheel vibration detection means" defined in the claims.

As seen in FIG. 2, each of the air pressure decrease determination sections 19 (19fl, 19fr, 19rl, 19rr) calculates a cross-correlation function in a sort of pattern recognition, relative to the vibration frequency reference spectrum data (stored in the second data buffers 17 (17fl, 17fr, 17rl, 17rr)) and the vibration frequency current spectrum data, and also calculates an autocorrelation function of the vibration frequency reference spectrum data. If the deviation between the cross-correlation function and the autocorrelation function exceeds a predetermined threshold value, the air pressure decrease determination section 19 determines underinflation of the tire (lowering of the air pressure), and outputs a drive signal to the air pressure warning indicator light 20 and the air pressure warning buzzer 21.

Operation of Tire Pressure Monitoring System

With reference to FIGS. 1 through 8, the operation of the tire pressure monitoring system 1 will be described. In the first embodiment, monitoring the tire pressure is executed for the respective wheels W (Wfl, Wfr, Wrl, Wrr) with the same operation method. Although the following descriptions will merely concern about the front left wheel Wfl, monitoring the tire pressure is also executed for the other wheels Wfr, Wrl, Wrr.

Preparation of Vibration Frequency Reference Spectrum Data

Figure 4:
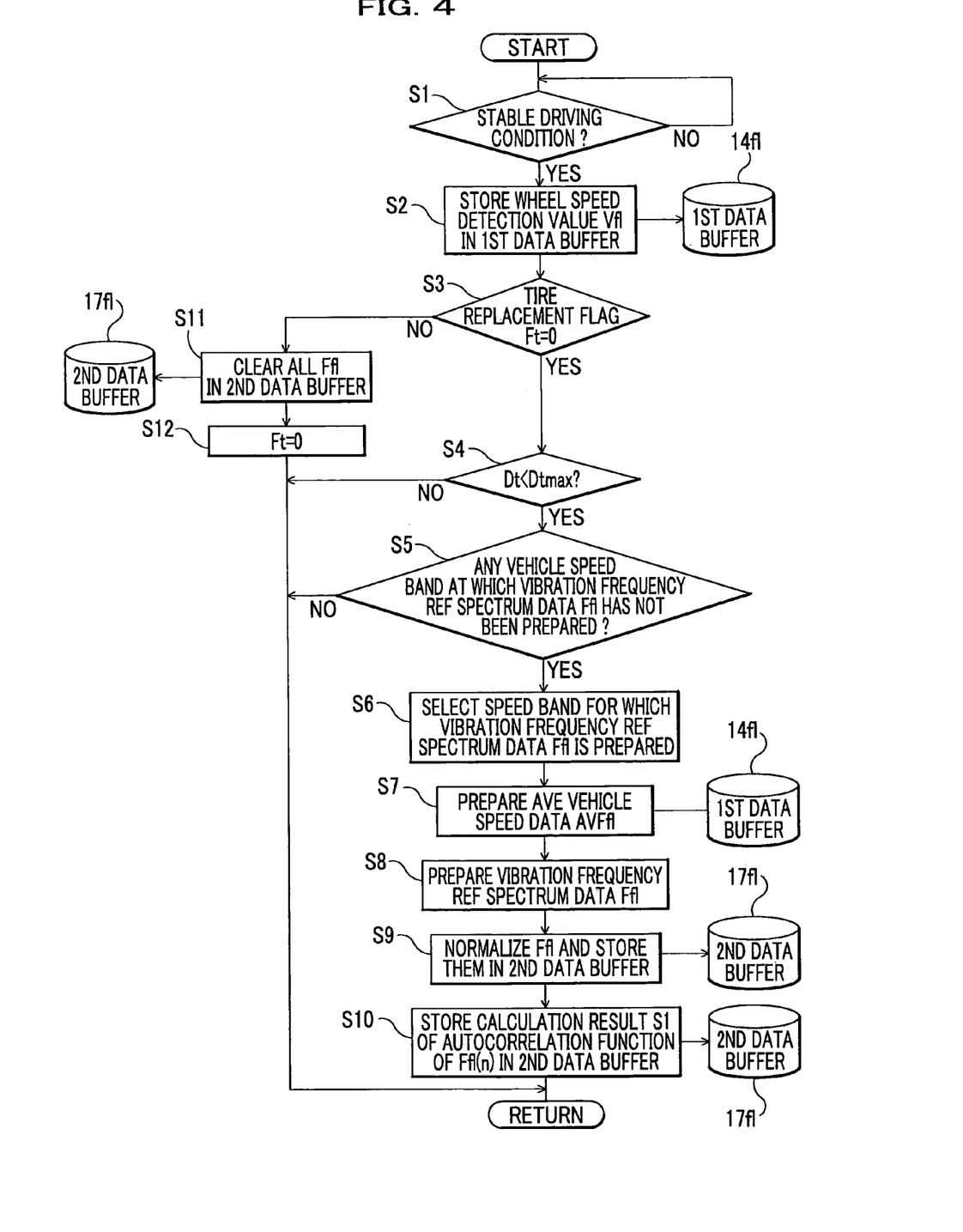
FIG. 4 is a flow chart partly illustrating a process for producing tire vibration frequency reference spectrum data, from among the process for monitoring the tire pressure according to the first embodiment.

With reference to FIG. 4 and partly to FIG. 1, the process for preparing the tire vibration frequency reference spectrum data will be described in relation to the front left wheel Wfl.

Once the vehicle C is assembled at a factory and moves as a bran-new car, the tire pressure monitoring system 1 starts to prepare the tire vibration frequency reference spectrum data as illustrated in the flow chart of FIG. 4. To be more specific, the stable discrimination calculating section 12 determines whether the vehicle C is in the stable driving condition (i.e. driving condition where the vehicle C runs in a straight forward direction at a certain speed), and if the determination results in "NO", the tire pressure monitoring system 1 returns to "START" to repeat the same step (S1). As described above, based on the difference in the rotational speed between the front left wheel Wfl and the front right wheel Wfr (deviation between the detection value Vfl of the wheel speed for the front left wheel and the detection value Vfr of the wheel speed for the front right wheel) and the like, the stable discrimination calculating section 12 calculates parameters for turning drive, accelerating/decelerating drive, snowy road drive, etc. (yaw rate, acceleration/deceleration speed, slip amount, etc.), and compares these parameters with a predetermined threshold value to determine whether the vehicle C is in the stable driving condition.

If the determination results in "YES" in step S1, as shown in FIG. 3, the tire pressure monitoring system 1 allows the detection values Vfl of the wheel speed to be stored in the first data buffer 14fl through the first buffer controller 13fl (S2). In this first embodiment, detection values Vfl of the wheel speed are obtained at a predetermined sampling interval of several to several tens of milliseconds. The detection values Vfl of the wheel speed are classified into predetermined speed bands, for example, in the range from 0–150 km/h and for every increase of 10 km/h (1–10 km/h, 11–20 km/h, 21–30 km/h.), and stored in the first data buffer 14fl.

Subsequently, the tire pressure monitoring system 1 determines whether a signal is not transmitted from the tire replacement reset switch (not shown) and the tire replacement flag Ft is "0" (S3). The tire replacement reset switch is provided, for example, in the instrument panel. When the mechanic or the driver resets the tire replacement reset switch at the time of replacement of tires in a maintenance shop or a tire shop, the tire replacement flag Ft becomes "1". The initial value of the tire replacement flag Ft is "0", and the determination in step S3 usually results in "YES".

In the case where the determination in step S3 results in "YES", the tire pressure monitoring system 1 then determines whether the total driving distance Dt does not exceed the data preparation reference distance Dtmax (S4). The data preparation reference distance Dtmax gives a restriction in terms of driving distance upon preparation of the vibration frequency reference spectrum data Ffl to be described later. The total distance data that is obtained by the odometer equipped in the vehicle C may be used as the total driving distance Dt. Alternatively, the total driving distance Dt may be calculated on the basis of detection values Vfl, Vfr of the wheel speed for the front wheels Wfl, Wfr and the peripheral length of the tire.

In the case where the determination in step S4 results in "YES", the tire pressure monitoring system 1 determines if there is any vehicle speed band at which the vibration frequency reference spectrum data Ffl has not been prepared in the second data buffer 17fl (S5). For example, because the vibration frequency reference spectrum data Ffl has not been prepared if the vehicle C is a brand-new car, the determination in step S5 results in "YES".

In the case where the determination in step S5 results in "YES", the tire pressure monitoring system 1 selects a speed band for which the vibration frequency reference spectrum data Ffl is prepared (S6). This can be executed on condition that for example more than 1024 continuous detection values Vfl corresponding to a certain speed band exist in the first data buffer 14fl. If there are several speed bands which satisfy this condition, then the speed band for which the number of detection values Vfl is largest may be selected.

After selecting a speed band for which the vibration frequency reference spectrum data Ffl is prepared in step S6, the tire pressure monitoring system 1 reads out the detection values Vfl stored in the first data buffer 14fl shown in FIGS. 2 and 3, and prepares the average reference vehicle speed data AVFfl (S7) by calculating a moving average for every 10 points including from the first to tenth points, from the second to eleventh points, etc., followed by calculation of the vibration frequency reference spectrum data Ffl (S8) by means of applying the fast Fourier transform (FFT) to the average reference vehicle speed data AVFfl. As shown in FIG. 3, the center frequency f0 of the vibration frequency reference spectrum Ffl is the natural frequency upon rotation of the tire. The natural frequency increases with the increase in the vehicle speed. If the moving average is calculated for every 10 points from the beginning of the continuous 1024 points, the total of 1015 moving average data (average reference vehicle speed data AVFfl) can be obtained.

Figure 5:
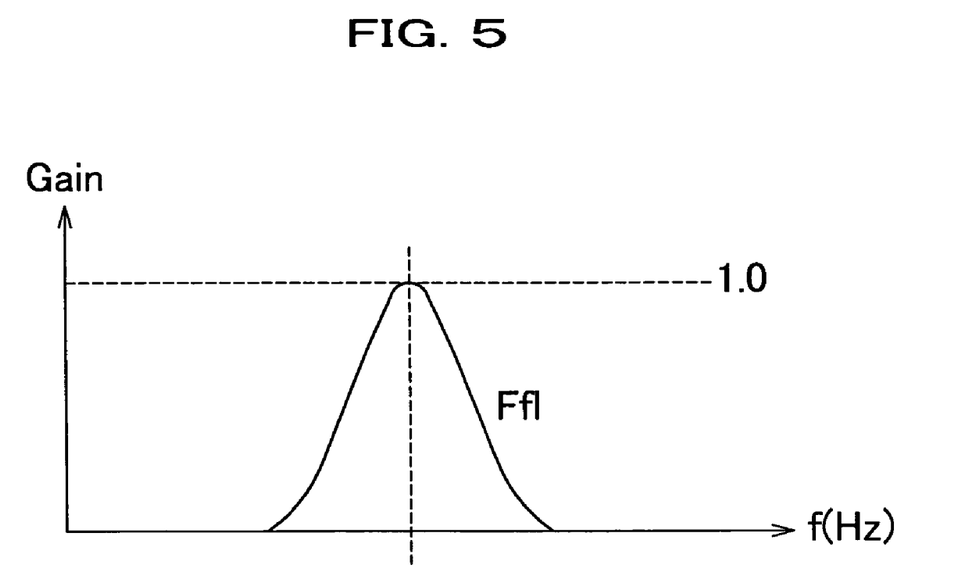
FIG. 5 is a graph illustrating the tire vibration frequency reference spectrum after normalization.

The tire pressure monitoring system 1 then normalizes the vibration frequency reference spectrum data Ffl, and stores the normalized vibration frequency reference spectrum data Ffl in the second data buffer 17fl (S9). To be more specific, the vibration frequency reference spectrum data Ffl is normalized such that the maximum value thereof becomes 1.0, and the normalized data is then stored in the second data buffer 17fl. Accordingly, the peak value of the gain of the vibration frequency reference spectrum Ffl becomes 1.0 as illustrated in the graph of FIG. 5.

Next, the tire pressure monitoring system 1 calculates an autocorrelation function (convolution integration) of the normalized vibration frequency reference spectrum data Ffl by the following equation (1), and stores the result S1 in the second data buffer 17fl (S10). In this calculation, for example, the vibration frequency reference spectrum data Ffl may be divided by 0.05 Hz for the frequency band extending around the peak value in the range of about 2.0 Hz to thereby obtain 40 points, so that the calculation is applied only to these 40 points.

$$S1 = Ffl(1)*Ffl(1) + Ffl(2)*Ffl(2) + \ldots + Ffl(40)*Ffl(40) \quad (1)$$

By executing the above processes, with increasing the driving distance of the vehicle C by the repeated drive on the road in town or high way, the vibration frequency reference spectrum data Ffl for the respective vehicle speed bands can be stored gradually.

Meanwhile, if the determination in step S4 results in "NO", that is, if the total driving distance Dt exceeds the data preparation reference distance Dtmax, the tire pressure monitoring system 1 returns to step S1 so that no substantive operation is carried out. Accordingly, it is possible to prevent the tire pressure monitoring system 1 from preparing the vibration frequency reference spectrum data Ffl on the basis of a tire of which tread has been worn after a long distance drive.

If the determination in step S3 results in "NO", that is, if the tire replacement flag Ft becomes 1, the tire pressure monitoring system 1 clears all the vibration frequency reference spectrum data Ffl in the second data buffer 17fl (S11), thereafter changes the tire replacement flag Ft to 0 (S12). The tire pressure monitoring system 1 then returns to step S1 and prepares the tire vibration frequency reference spectrum data again. Therefore, if tires with a different standard are mounted in a maintenance shop or a tire shop, it is possible to prepare the vibration frequency reference spectrum data Ffl in accordance with the characteristics and the like of the replaced tires.

Determination Process for Lowering of Air Pressure

Figure 6:
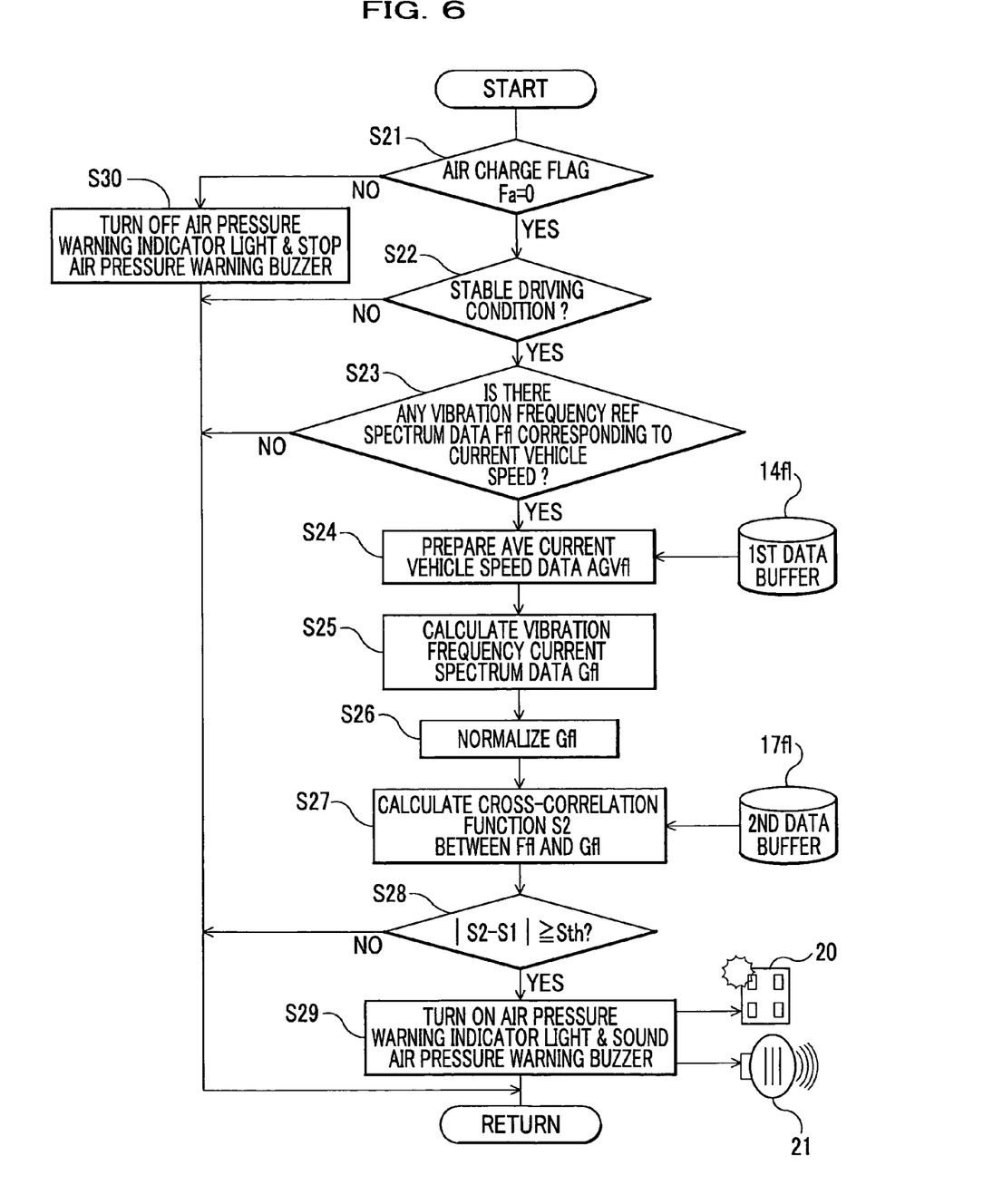
FIG. 6 is a flow chart partly illustrating a process for determining lowering of the tire pressure, from among the process for monitoring the tire pressure according to the first embodiment.
Figure 7:
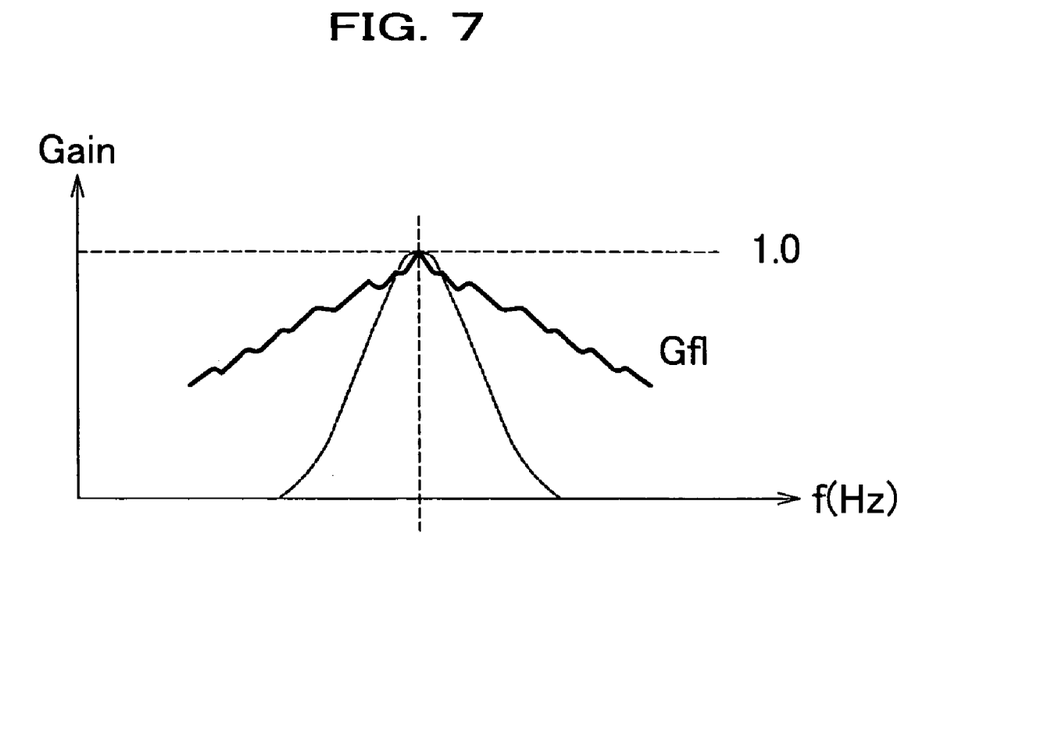
FIG. 7 is a graph showing the tire vibration frequency current spectrum after normalization.
Figure 8:
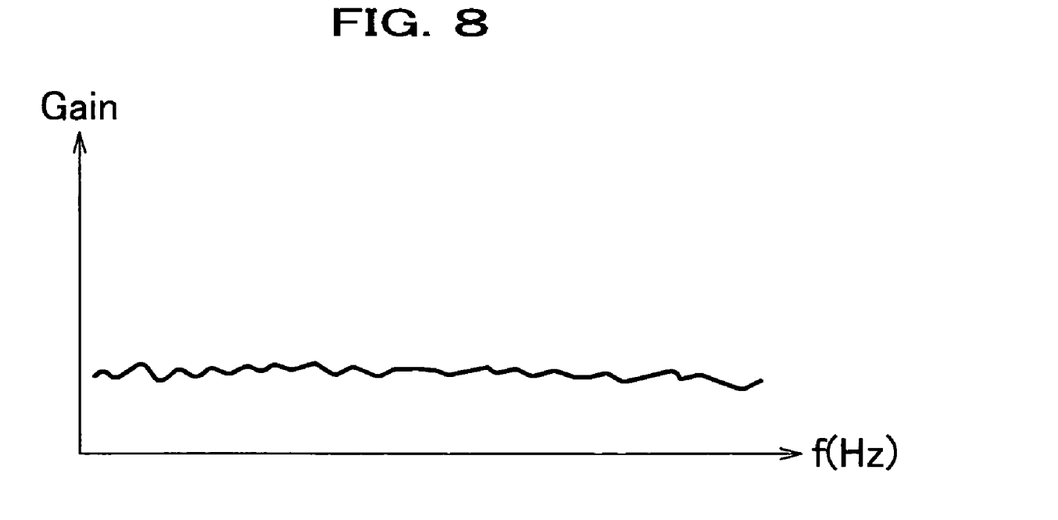
FIG. 8 is a graph showing an example of white noise.

With reference to FIG. 6 and partly in FIG. 1, etc., the determination process for lowering of air pressure will be described below in connection with the front left wheel Wfl.

The tire pressure monitoring system 1 starts to determine lowering of air pressure (underinflation of the tire) as shown in FIG. 6, while preparing the tire vibration frequency reference spectrum data as described above. In other words, the tire pressure monitoring system 1 determines whether a signal is not inputted from the air charge reset switch (not shown) and the air charge flag Fa is "0" (S21). The air charge reset switch is provided, for example, in the instrument panel. At the time of fixing a flat tire or charging the air to an appropriate amount at a maintenance shop or a tire shop, the mechanic or the driver operates the switch to reset the air charge flag Fa to "1". The initial value of the air charge flag Fa is "0", and the above determination usually results in "YES" during the normal driving.

If the determination in step S21 results in "YES", the tire pressure monitoring system 1 then determines whether the vehicle C is in the stable driving condition at the stable discrimination calculating section 12. In the case where the determination results in "NO", the operation returns to "START" and repeats the above processes (S22). This process is the same as step S1 of "PREPARATION OF VIBRATION FREQUENCY REFERENCE SPECTRUM DATA".

If the determination in step S22 results in "YES", the tire pressure monitoring system 1 then determines whether the vibration frequency reference spectrum data Ffl for the speed band, within which the current vehicle speed is included, is stored in the second data buffer 17fl. In the case where the determination results in "NO", the operation returns to "START" and repeats the above processes (S23). This is because the preparation of the vibration frequency current spectrum data Gfl will be meaningless unless the vibration frequency reference spectrum data Ffl exists in the corresponding speed band.

If the determination in step S23 results in "YES", the tire pressure monitoring system 1 then calculates the moving average for every 10 points among the current continuous 1024 detection values Vfl stored in the first data buffer 14fl to prepare the average current vehicle speed data AVGfl (S24). Subsequently, the tire pressure monitoring system 1 applies the fast Fourier transform (FFT) to the average current vehicle speed data AVGfl to calculate the vibration frequency current spectrum data Gfl (S25).

The tire pressure monitoring system 1 then normalizes the vibration frequency current spectrum data Gfl (S26). To be more specific, the normalization process is carried out such that the maximum value of the gain of Gfl becomes 1.0. As shown by the broken line in the graph shown in FIG. 7, the normalized vibration frequency current spectrum Gfl becomes the same as the vibration frequency reference spectrum Ffl when the vehicle C is a brand-new car with the tires being new under an appropriately adjusted air pressure. However, as shown by the solid line in the graph shown in FIG. 7, with increasing the contact area of the tire due to lowering of the air pressure, mixture of white noise (one example shown in FIG. 8) makes the bandwidth wider.

Next, in order to compare the vibration frequency reference spectrum Ffl and the vibration frequency current spectrum Gfl, the tire pressure monitoring system 1 calculates a cross-correlation function (convolution integration) between the vibration frequency reference spectrum data Ffl and the vibration frequency current spectrum data Gfl by the following equation (2) (S27). Also in this calculation, for example, the vibration frequency reference spectrum data Ffl and the vibration frequency current spectrum data Gfl maybe divided by 0.05 Hz for the frequency band extending around the peak value in the range of about 2.0 Hz to thereby obtain 40 points.

$$S2=Ffl(1)*Gfl(1)+Ffl(2)*Gfl(2)+ \ldots +VFfl(40)*VGfl(40) \quad (2)$$

The tire pressure monitoring system 1 extracts from the second data buffer 17fl the calculation result S1 of the convolution integration (equation (1)) of the vibration frequency reference spectrum data Ffl corresponding to the current vehicle speed band, and if the absolute value of the deviation between the calculation result S1 and the calculation result S2 of the equation (2) is equal to or greater than a predetermined threshold value Sth, then determines that the front left wheel Wfl is underinflated (S28). Herein, the threshold value Sth may be determined previously by an experiment as the absolute value of the deviation at which the air pressure lowers, for example, by 30%.

$$|S2-S1| \geq Sth \quad (3)$$

Subsequently, the tire pressure monitoring system 1 outputs a drive signal to the air pressure warning indicator light 20 and the air pressure warning buzzer 21 (S29), so as to warn the driver of the underinflation of the tire by the display and the sound.

Meanwhile, if the determination in step S21 results in "NO", that is, if the air charge flag Fa is 1, the tire pressure monitoring system 1 stops the output of the drive signal to the air pressure warning indicator light 20 and the air pressure warning buzzer 21 (S30). The operation then returns to step S21 to repeat the determination process for lowering of air pressure. Therefore, if the mechanic or the driver operates the air charge reset switch, for example, at the time of fixing a flat tire and charging the air to an appropriate air pressure at a maintenance shop or a tire shop, the air pressure warning indicator light 20 becomes off and the warning sound of the air pressure warning buzzer 21 stops.

<Second Embodiment>

A second embodiment of the present invention will be described below. According to the second embodiment, the vibration frequency reference spectrum data for each wheel and for the respective vehicle speed bands is stored in the reference speed spectrum data storage means in association with vehicle speed. Between the front wheels and the rear wheels is applied a pattern matching relative to a change pattern of the detection values detected by each wheel vibration detection means, so as to obtain the time difference corresponding to the coincident patterns. The current vehicle speed is calculated based on this time difference and a previously stored reference distance, to thereby reading out from the reference spectrum data storage means the vibration frequency reference spectrum data corresponding to the current vehicle speed. The calculation method according to the second embodiment is also disclosed in Japanese Laid-open Patent Application No. 2002-69391 proposed by the applicant for the present invention, the contents of which are hereby incorporated by reference.

To be more specific, the calculation method according to the second embodiment is based on the findings that detection values of the vibration detection sensor (wheel speed sensor) change due to a level difference or a bump (roughness on the road surface), and that such a change first appears in the detection values at the front wheel sensors and then appears in the detection values at the rear wheel sensors if the vehicle runs in the advance direction In this instance, if the changes in the detections values at the front and rear wheels are derived from the same level difference or bump, and if the time interval between the changes is obtained, vehicle speed can be obtained based on the wheel base (reference distance) of the vehicle without being affected by a change in the tire diameter.

This calculation method can calculate vehicle speed in consideration of time required for a certain length of object (vehicle body) to pass over a point (a bump, etc.) on the road. In principle, this is different from the prior art in which vehicle speed is calculated in consideration of the number of rotations of the tire pera certain length of time. Therefore, it is possible to detect vehicle speed without (substantially) being affected by a change in the tire diameter. Based on this obtained vehicle speed, the tire vibration frequency spectrum is read out from a ROM and the like. By comparing the obtained vibration frequency reference spectrum data and the vibration frequency spectrum data, lowering of the air pressure (underinflation of the tire) can be determined highly accurately.

In the aforementioned calculating method, vehicle speed is detected based on a time difference between front and rear wheels to be detected by means of pattern matching, the purpose of which is to detect a change in detection values of the wheel speed at the front wheel side and to detect when the same change appears at the rear wheel side. However, vehicle speed may be detected by means of pattern matching between the rear wheel side and the front wheel side, during which are detected a change in detection values of the wheel speed at the rear wheel side and when the same change appeared previously at the front wheel side.

Determination Process for Lowering of Air Pressure

Figure 9:
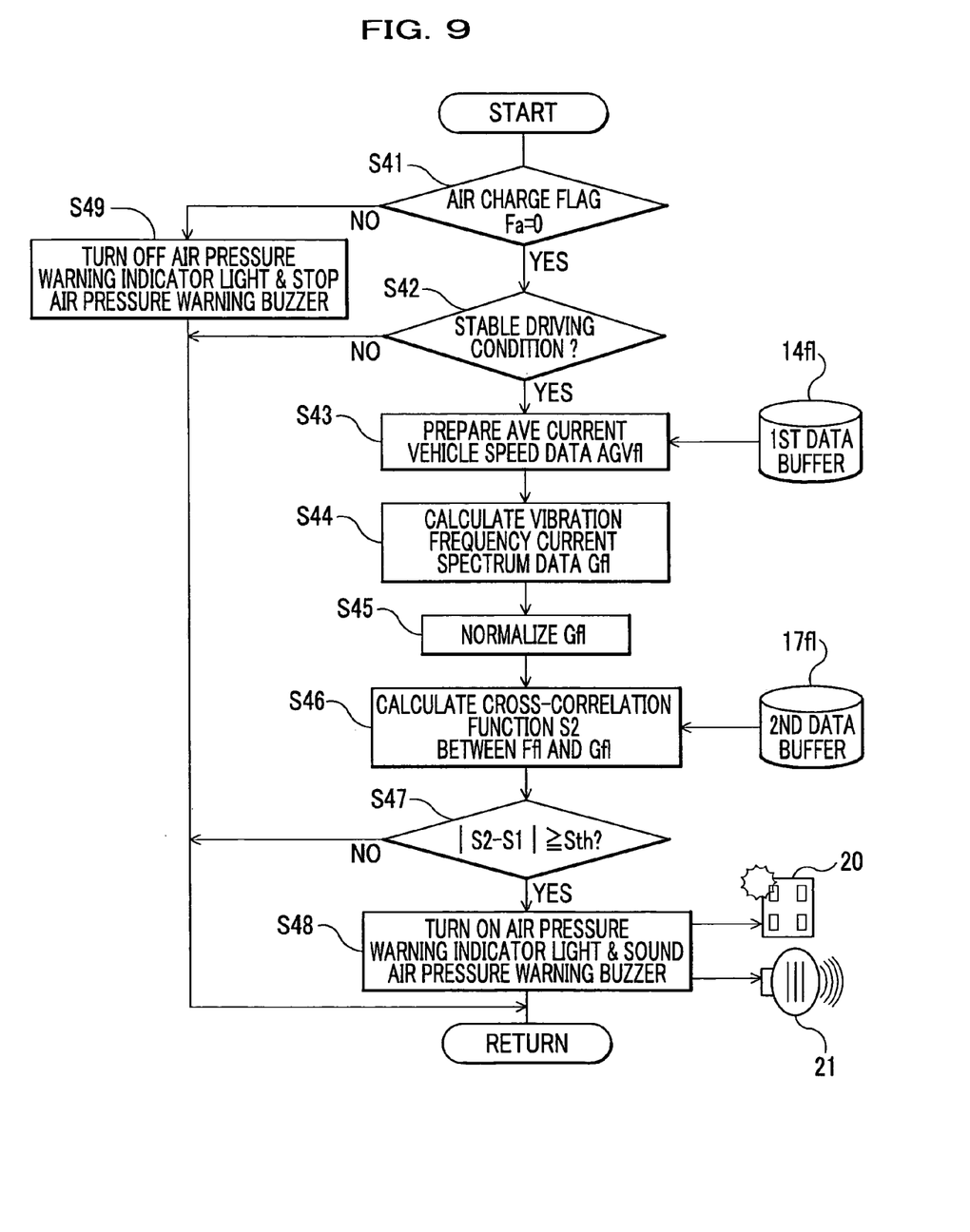
FIG. 9 is a flowchart illustrating the process for determining lowering of the tire pressure according to a second embodiment of the present invention.

In the second embodiment, the tire pressure monitoring system 1 starts to determine lowering of air pressure (underinflation of the tire) as shown in the flow chart of FIG. 9, while calculating the average vehicle speed AVv by the aforementioned vehicle speed detection apparatus. As is the case with the first embodiment, the tire pressure monitoring system 1 determines whether a signal is not inputted from the air charge reset switch (not shown) and the air charge flag Fa is "0" (S41).

If the determination in step S41 results in "YES", the tire pressure monitoring system 1 then determines whether the vehicle C is in the stable driving condition at the stable discrimination calculating section 12. In the case where the determination results in "NO", the operation returns to "START" and repeats the above processes (S42).

If the determination in step S42 results in "YES", as is the case with the first embodiment, the tire pressure monitoring system 1 then calculates the moving average for every 10 points among the current continuous 1024 detection values Vfl stored in the first data buffer 14fl to prepare the average current vehicle speed data AVGfl (S43). Subsequently, the tire pressure monitoring system 1 applies the fast Fourier transform (FFT) to the average current vehicle speed data AVGfl to calculate the vibration frequency current spectrum data Gfl (S44).

The tire pressure monitoring system 1 then normalizes the vibration frequency current spectrum data Gfl (S45) as is the case with the first embodiment.

Next, the tire pressure monitoring system 1 reads out the vibration frequency reference spectrum Ffl corresponding to the average vehicle speed AVv detected by the vehicle speed detecting apparatus (not shown) from the second data buffer 17fl as the reference spectrum data storage means. In order to compare the vibration frequency reference spectrum Ffl and the vibration frequency current spectrum Gfl, the tire pressure monitoring system 1 calculates the cross-correlation function (convolution integration) between the vibration frequency reference spectrum data Ffl and the vibration frequency current spectrum data Gfl by the following equation (2) (S46). According to the second embodiment, together with the calculation result S1 of the convolution integration, the second data buffer 17fl stores the vibration frequency reference spectrum Ffl that is previously obtained by an experiment for each vehicle speed band.

$$S2 = Ffl(1)*Gfl(1) + Ffl(2)*Gfl(2) + \ldots + VFfl(40)*VGfl(40) \quad (2)$$

The tire pressure monitoring system 1 extracts from the second data buffer 17fl the calculation result S1 of the convolution integration (equation (1)) of the vibration frequency reference spectrum data Ffl corresponding to the current vehicle speed band, and if the absolute value of the deviation between the calculation result S1 and the calculation result S2 of the equation (2) is equal to or greater than a predetermined threshold value Sth, then determines that the front left wheel Wfl is underinflated (S47).

$$|S2 - S1| \geq Sth \quad (3)$$

Subsequently, the tire pressure monitoring system 1 outputs a drive signal to the air pressure warning indicator light 20 and the air pressure warning buzzer 21, so as to warn the driver by the display and the sound (S48).

Meanwhile, if the determination in step S41 results in "NO", that is, if the air charge flag Fa is 1, the pressure monitoring system 1 stops the output of the drive signal to the air pressure warning indicator light 20 and the air pressure warning buzzer 21 (S49) as is the case with the first embodiment. The operation then returns to step S41 to repeat the determination process to determine lowering of the air pressure.

While the present invention has been described in detail with reference to specific embodiments thereof, it will be apparent to one skilled in the art that various changes and modifications may be made without departing from the scope of the claims.

Although in the above embodiments the sampling interval of the wheel speed detection values has been described as in the range of from several milliseconds to several tens of milliseconds, the sampling interval may vary in accordance with vehicle speed such as to be shorter as the vehicle speed increases. Determination of the air pressure may be carried out, for example, at every 10 minutes or whenever the vehicle C starts to run after the ignition key is turned ON. Various processes of the tire pressure monitoring system 1 may be executed by means of hardware.

Description has been given of the wheel speed sensor as an example of the vibration detection sensor. However, as long as it can detect vibration generated between the road surface and the vehicle (tires), various sensors such as a displacement meter, a weight meter, and a G sensor maybe employed. For example, these sensors may be arranged at suspensions of the front and rear wheel sides so that the vibration frequency spectrum data can be calculated from the detection values.

In the above embodiments, similarity of the patterns of the vibration frequency spectrum data is determined by means of a cross-correlation function. However, such a determination method is only an example and the present invention is not limited to this specific method. Lowering of the air pressure (underinflation of the tire) may be determined by comparing the similarity of the patterns by means of any known method, followed by the determination whether the comparison result (similarity) exceeds a predetermined value.

In the first embodiment, the vibration frequency reference spectrum data is prepared during the driving of the vehicle. However, as is the case with the second embodiment, the vibration frequency reference spectrum data may be stored previously in the data buffer. This can also achieve advantages of the present invention. On the contrary, in the second embodiment, the vibration frequency reference spectrum data obtained by an experiment, etc. may be previously stored in the data buffer. However, the vibration frequency reference spectrum data may be prepared during the driving of the vehicle as is the case with the first embodiment. This can achieve the monitoring of tire pressure in a more precise manner. In the first and second embodiments, preparation of the reference spectrum data is executed at the time of replacement of tires or at the time of charging the air pressure. However, in principle, because kinds of the tires hardly affect the tire pressure monitoring system according to the present invention, it is not necessary to prepare the reference spectrum data at every occasion to replace the tires or to charge the air pressure.

What is claimed is:

1. A tire pressure monitoring system comprising:
   a wheel vibration detection means which detects vibrations of a wheel mounted to a vehicle;
   a speed detection means which detects wheel speed;
   a vibration frequency spectrum data producing means which applies a predetermined converting process to detection values from the wheel vibration detection means and produces vibration frequency spectrum data consisting of vibration frequency and a gain of the vibration frequency caused by a rotation of the wheel;
   a vibration frequency reference spectrum data storage means which stores a plurality of vibration frequency reference spectrum data in a manner associated with wheel speed, the vibration frequency reference spectrum data being used as a reference for a case where air pressure of a tire attached to the wheel is a normal value; and
   an air pressure determination means which reads the vibration frequency reference spectrum data from the vibration frequency reference spectrum data storage means on the basis of a current wheel speed or a current vehicle speed, compares a pattern of the thus read vibration frequency reference spectrum data with a pattern of current vibration frequency spectrum data produced by the vibration frequency spectrum data producing means, and determines that the tire is underinflated if a comparison result of these patterns exceeds a predetermined value.

2. A tire pressure monitoring system according to claim 1, further comprising means for producing the vibration frequency reference spectrum data at the time of driving the vehicle by means of applying a predetermined converting process to the detection values from the wheel vibration detection means, wherein the produced vibration frequency reference spectrum data is stored in the vibration frequency reference spectrum data storage means in a manner associated with vehicle speed.

3. A tire pressure monitoring system according to claim 1, wherein the wheel vibration detection means is a wheel speed sensor.

4. A tire pressure monitoring system according to claim 2, wherein the wheel vibration detection means is a wheel speed sensor.

5. A tire pressure monitoring system comprising:
a wheel vibration detection means which detects vibrations of a wheel mounted to a vehicle;
a speed detection means which detects the speed of the vehicle;
a vibration frequency spectrum data producing means which applies a predetermined converting process to detection values from the wheel vibration detection means and produces vibration frequency spectrum data consisting of vibration frequency and a gain of the vibration frequency caused by a rotation of the wheel;
a vibration frequency reference spectrum data storage means which stores a plurality of vibration frequency reference spectrum data in a manner associated with vehicle speed, the vibration frequency reference spectrum data being used as a reference for a case where air pressure of a tire attached to the wheel is a normal value; and
an air pressure determination means which reads the vibration frequency reference spectrum data from the vibration frequency reference spectrum data storage means on the basis of a current wheel speed or a current vehicle speed, compares a pattern of the thus read vibration frequency reference spectrum data with a pattern of current vibration frequency spectrum data produced by the vibration frequency spectrum data producing means, and determines that the tire is underinflated if a comparison result of these patterns exceeds a predetermined value.

6. A tire pressure monitoring system according to claim 5, further comprising means for producing the current vibration frequency reference spectrum data at the time of driving the vehicle by means of applying a predetermined converting process to the detection values from the wheel vibration detection means, wherein the produced vibration frequency reference spectrum data is stored in the vibration frequency reference spectrum data storage means in a manner associated with vehicle speed.

7. A tire pressure monitoring system for monitoring tire pressure within the wheel of a vehicle, the system comprising
a microprocessor, the microprocessor including data input means, data output means, data processing means and data storage means,
the system further comprising a wheel vibration detection means, vehicle speed determination means, and a tire pressure signaling means,
wherein the data processing means comprises means for producing vibration frequency spectra,
wherein data from the wheel vibration detection means detected under normal tire pressure conditions is input to the microprocessor and processed into vibration frequency reference spectra, and wherein plural vibration frequency reference spectra are stored within the data storage means, such that at least one vibration frequency reference spectrum is stored for each of a plurality of vehicle speed ranges,
wherein data from the wheel vibration detection means under current tire pressure conditions is input to the microprocessor and processed by the data processing means into vibration frequency current spectra, and
wherein the data processing means provides a comparison between the vibration frequency current spectra and the stored vibration frequency reference spectra for a vehicle speed corresponding to the current vehicle speed,
and wherein the tire pressure alarm is activated by the data output means when the results of the comparison exceed a predetermined level.

8. The tire pressure monitoring system of claim 7 wherein both the vibration frequency current spectra and the vibration frequency reference spectra are normalized prior to the comparison.

9. The tire pressure monitoring system of claim 7 wherein the vehicle speed is calculated from data obtained from a sensor sensing wheel vibrations.

10. The tire pressure monitoring system of claim 7 wherein vehicle speed is calculated from data obtained from a sensor sensing wheel rotations.

* * * * *